April 24, 1962
C. F. H. PFEIFFER
3,031,343
ARC WELDING OF JOINTS IN CONSTRUCTIONS LIABLE TO
BE SUBJECTED TO LOW TEMPERATURES AND ARC
WELDING ELECTRODES THEREFOR
Filed Dec. 15, 1958
FIG. 1.
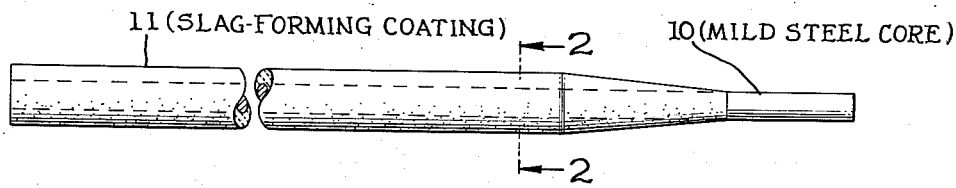
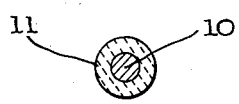
FIG. 2.
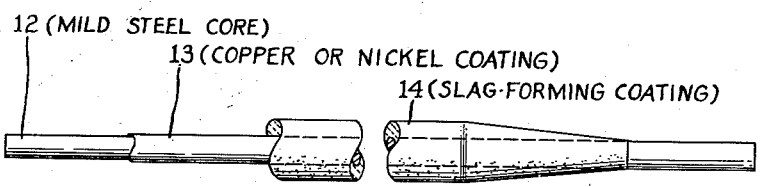
FIG. 3.
INVENTOR
CLAES FREDRIK HAKAN PFEIFFER
BY Cameron, Kerkam & Sutton
ATTORNEYS

United States Patent Office 3,031,343
Patented Apr. 24, 1962

3,031,343
ARC WELDING OF JOINTS IN CONSTRUCTIONS LIABLE TO BE SUBJECTED TO LOW TEMPERATURES AND ARC WELDING ELECTRODES THEREFOR
Claes Fredrik Håkan Pfeiffer, Goteborg, Sweden, assignor to Elektriska Svetsningsaktiebolaget, Goteborg, Sweden, a corporation of Sweden
Filed Dec. 15, 1958, Ser. No. 780,205
Claims priority, application Sweden Dec. 21, 1957
5 Claims. (Cl. 117—204)

The present invention relates to the production of welded structures liable to be subjected in service to low temperatures, such as −20° C. or below, particularly large structures such as bridges, masts, towers, large containers, and ship hulls. It is well known that, at the low temperatures indicated, failure through brittle fracture is much more liable to occur than at temperatures above freezing-point, and it is also well recognized that, for any given structure, the probability of failure through brittle fracture under given temperatures and load conditions will depend both on design factors and on the composition and properties of the materials employed. In particular, high demands are made on the material of the welded joints, said joints being generally more liable than other parts of the construction to be subjected to the type of stresses favouring brittle fracture.

In the welding of structures of the kind indicated, the so-called lime-fluoride, or low hydrogen, electrodes are now being extensively used. In this context, lime-fluoride electrodes are to be defined as coated electrodes in which the slag-forming constituents of the coating consist substantially of alkaline earth carbonate (usually limestone) and fluoride (fluorspar or cryolite). At freezing point or higher temperatures, the weld metal deposited by the usual lime-fluoride coated electrodes has so high an impact value (as determined by, for instance, the Charpy V test) that further increase of the same would have no practical importance. On decrease of the temperature, however, the impact value will fall off rapidly in the so-called transition range, so that, at temperatures having to be counted with in practice, the impact value will attain very low figures indicating an unsatisfactory degree of safety against brittle fracture. This is true also in respect of a known type of lime-fluoride coated electrodes containing, as a special alloying ingredient, an addition of copper of the same order of magnitude as the copper content of the so-called copper-bearing structural steels, that is, 0.2 or 0.3 percent by weight of the metallic constituents of the electrode, the principal purpose of said addition of copper being to impart to the weld deposit an increased resistance against atmospheric corrosion.

It is an object of the invention to provide a method of producing a mild steel welded joint having such properties as to yield a substantially increased degree of safety against brittle fracture or cleavage cracking at low temperatures. A further object is to provide a method of producing a mild steel welded joint having such properties as to enable it to serve as a crack arrestor even at low temperatures, that is, to enable the weld not to propagate a cleavage crack originating in a part of the construction outside the weld. It is also an object of the invention to provide an improved mild steel weld deposit alloy having the valuable properties just indicated. Another object of the invention is the provision of an improved lime-fluoride coated mild steel welding electrode for the production of welded joints having the valuable properties just indicated.

Other objects and features of the invention will be apparent from the following specification and the claims.

The invention is based on the new discovery that the addition of a sufficient proportion of copper, not below 0.5 percent by weight, to the weld deposit of a mild steel welding electrode of the lime-fluoride type will result in a substantial increase of the impact toughness at low temperatures and, consequently, in a substantial decrease of the tendency to brittle fracture of the weld deposit. It has also been established that nickel may replace the copper to a certain degree.

Accordingly, the invention comprises an improvement in the method of producing welded joints between mild steel members required to sustain stresses at low temperatures which comprises supplying a mild steel weld metal to said joints by means of a lime-fluoride coated steel electrode, said improvement comprising the incorporating in said lime-fluoride coated electrode of a content of metal from the group consisting of copper and mixtures of copper and nickel amounting to not less than 0.5 percent and not more than 1.25 percent by weight of the metallic constituents of the electrode, the weight ratio of nickel to copper not exceeding unity, the amount of copper will therefore always exceed approximately 0.25% by weight. Preferably the content of copper should not be below 0.5 percent even if nickel is present. The expression "mild steel" as above used to characterize the weld metal should be understood to mean steels which contain not more than 0.25 percent of carbon, preferably not more than 0.1 percent, and which also contain, in addition to the special metals to be added according to the invention, silicon and manganese in the proportions usually employed for deoxidizing purposes or for adjusting the tensile strength of the weld metal deposited by lime-fluoride coated electrodes, for instance 0.7 percent silicon and 1.5 percent manganese. The contents of said metals should not exceed 0.8 percent silicon and 1.7 percent manganese. The weld metal deposit may also contain small proportions of other metals sometimes employed in mild steel weld deposits, for instance titanium and aluminium, as well as usual impurities, among which chromium in amounts up to 0.1 percent is to be counted. The total content of metals other than iron, copper and nickel should not exceed 2.5 percent by weight.

The improved welded joints according to the invention generally contain a mild steel weld deposit of the following composition:

| | Percent by weight |
|---|---|
| Carbon | Not above 0.25 |
| Manganese | About 0.5 to 1.7 |
| Silicon | About 0.3 to 0.8 |
| Copper and nickel, total | About 0.5 to 1.25 | and iron substantially the remainder, the weight ratio of nickel to copper not exceeding unity, and the aggregate content of metals other than iron, copper and nickel not exceeding 2.5 percent.

The invention also comprises an arc welding electrode comprising a core of mild steel and a coating of the lime-fluoride type the electrode as a whole being so composed as to provide a mild steel weld deposit, the characterizing feature of said electrode being a content of metal from the group consisting of copper and nickel amounting to not less than 0.5 percent and not more than 1.25 percent by weight of the metallic constituents of the electrode, the weight ratio of nickel to copper not exceeding unity. A preferred range of the copper content is 0.7 to 0.8 percent, with no nickel present.

In the accompanying drawing,

FIG. 1 is a side view of a coated electrode in accordance with an embodiment of the present invention;

FIG. 2 is a sectional view of the electrode of FIG. 1 on the line 2—2 thereof; and FIG. 3 is a side view of a coated electrode in accordance with another embodiment of the present invention.

In FIGS. 1 and 2, 10 denotes the mild steel core, 11 denotes the slag-forming coating consisting of a mixture of slag-forming constitutents, powdered metal and a binder, and, in FIG. 3, 12 denotes the mild steel core, 13 denotes the copper or nickel coating and 14 denotes the slag-forming coating.

The copper and the nickel content of the electrode may form part of the electrode core, for instance in the form of alloying constituents of the core metal or in the form of a metallic coating on the core wire, or they may form part of the electrode coating, for instance in the form of copper powder or a powdered copper-nickel alloy or powdered cuprous oxide or cupric oxide, said oxides being reduced to metallic copper under the welding conditions. The metal or metals in question may also be divided between the core and the coating. For instance, the mild steel core wire may contain 0.15 to 0.20 percent copper, while the remaining part of the quantity of copper required to be contained in the electrode, as well as the quantity of nickel which may be required, form constituents of the coating. It is also possible to supply the copper and/or the nickel in the form of a thin wire wound about the core wire.

While cobalt is to be regarded as an equivalent to nickel for the purposes of the invention, the possibilities of employing cobalt instead of or together with nickel has little practical interest, as cobalt in this connection has no advantages over nickel to justify its higher price.

If copper alone (without nickel or cobalt) is used in the electrode according to the invention, a content of about 0.8 percent of the total weight of the metallic constituents of the electrode will generally be suitable.

An example of a welding electrode according to the invention will now be described. The core wire, the diameter of which is 4 mm. (0.158 in.), consists of practically copper-free carbon steel (C 0.10 percent) and is provided with an electroplated copper coating the weight of which is 1 percent of the weight of the steel wire. The extruded slag-forming coating has an outer diameter of 6.65 mm. (0.262 in.) and consists, apart from the binder (potassium silicate), of the following compound:

| | Percent by weight |
|---|---|
| Limestone | 25 |
| Fluorspar | 20 |
| Rutile | 5 |
| China clay | 2 |
| Iron powder | 39 |
| Ferrosilicon (45 percent Si) | 6 |
| Ferromanganese (80 percent Mn) | 3 |
| | 100 |

The weld metal deposited by this electrode has a copper content of about 0.8 percent. Below are tabulated the results of a series of impact tests with all-weld-metal Charpy V-notch specimens produced, respectively, with the electrode above indicated and with an electrode having no copperplating on the core wire but identically similar in all other respects.

| Temperature, Deg. centigrade | Impact value, kgm./cm.$^2$ | |
|---|---|---|
| | 0% Cu | 0.8% Cu |
| +20 | 24.3 | 26.6 |
| 0 | 20.4 | 24.3 |
| −20 | 10.7 | 21.2 |
| −40 | 3.3 | 16.6 |
| −60 | 1.4 | 4.2 |

A comparison will show that the addition of copper according to the invention has shifted the so-called transition range very considerably towards lower temperatures. In fact, the impact value-temperature curve has been displaced about 30° C. towards the left. As a general rule, the copper addition according to the invention will displace the transition range by at least some 15 or 20° C. towards lower temperatures, compared to welds produced with similar electrodes containing no copper.

I claim:

1. In a welded steel construction required to sustain stresses at low temperatures, a welded joint containing a mild steel deposit consisting of

| | Percent by weight |
|---|---|
| Carbon | Not above 0.25 |
| Manganese | About 0.5 to 1.7 |
| Silicon | About 0.3 to 0.8 | and a metal selected from the group consisting of copper in amount of 0.5 to 1.25 percent by weight, copper and nickel in total amount of 0.5 to 1.25% by weight, copper and cobalt in total amount of 0.5 to 1.25% by weight and copper and nickel and cobalt in total amount of 0.5 to 1.25% by weight, the ratio of the weight of nickel to the weight of copper not exceeding unity, the ratio of the weight of nickel and cobalt to the weight of copper not exceeding unity, the ratio of the weight of cobalt to the weight of copper not exceeding unity, the amount of copper being not less than 0.25% by weight and iron substantially the remainder, the aggregate content of metals other than iron, copper, nickel and cobalt not exceeding 2.5% by weight.

2. An arc welding electrode consisting of a core of mild steel and a coating thereon, said coating substantially consisting of slag-forming nonmetallic substances, powdered metal, and a binder, said slag-forming nonmetallic substances consisting mainly of alkaline earth carbonates and fluorides, the metallic part formed by said core and said powdered metal being so composed as to yield a mild steel deposit consisting of

| | Percent by weight |
|---|---|
| Carbon | Not above 0.25 |
| Manganese | About 0.5 to 1.7 |
| Silicon | About 0.3 to 0.8 | and a metal selected from the group consisting of copper in an amount of 0.5 to 1.25% by weight, copper and nickel in a total amount of 0.5 to 1.25% by weight, copper and nickel and cobalt in total amount of 0.5 to 1.25% by weight and copper and cobalt in total amount of 0.5 to 1.25% by weight, the ratio of the weight of nickel to the weight of copper not exceeding unity, the ratio of the weight of nickel and cobalt to the weight of copper not exceeding unity, the ratio of the weight of cobalt to the weight of copper not exceeding unity, the amount of copper being not less than 0.25% by weight and iron substantially the remainder, the aggregate content of metals other than iron, copper, nickel and cobalt not exceeding 2.5% by weight.

3. An arc welding electrode as claimed in claim 2 in which the metallic content of the electrode contains 0.7 to 0.8% by weight of copper only.

4. An arc welding electrode as claimed in claim 2 in which the core is copper coated.

5. An arc welding electrode as claimed in claim 2 in which the core is nickel coated.

References Cited in the file of this patent

UNITED STATES PATENTS

| | | |
|---|---|---|
| 2,010,605 | Miller | Aug. 6, 1935 |
| 2,146,320 | Walters | Feb. 7, 1939 |
| 2,158,105 | Burgess | May 16, 1939 |
| 2,544,000 | Wasserman | Mar. 6, 1951 |
| 2,805,152 | Sherwin | Sept. 3, 1957 |
| 2,855,333 | Wasserman et al. | Oct. 7, 1958 |